United States Patent
Srivastava

(10) Patent No.: US 10,824,648 B2
(45) Date of Patent: Nov. 3, 2020

(54) CLASSIFICATION AND DISTRIBUTION OF EXTENSION OBJECTS IN MULTITENANT ENVIRONMENTS

(71) Applicant: SAP SE, Walldorf (DE)

(72) Inventor: Garima Srivastava, Bangalore (IN)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 15/956,512

(22) Filed: Apr. 18, 2018

(65) Prior Publication Data
US 2019/0325058 A1 Oct. 24, 2019

(51) Int. Cl.
| | |
|---|---|
| G06F 16/28 | (2019.01) |
| G06F 16/22 | (2019.01) |
| G06F 16/25 | (2019.01) |
| G06F 8/61 | (2018.01) |
| G06F 8/70 | (2018.01) |
| G06F 9/455 | (2018.01) |
| G06F 9/50 | (2006.01) |

(52) U.S. Cl.
CPC .............. *G06F 16/285* (2019.01); *G06F 8/61* (2013.01); *G06F 8/70* (2013.01); *G06F 9/455* (2013.01); *G06F 9/5061* (2013.01); *G06F 16/2282* (2019.01); *G06F 16/252* (2019.01)

(58) Field of Classification Search
CPC .. G06F 16/252; G06F 16/285; G06F 16/2282; G06F 8/61; G06F 8/70; G06F 9/455; G06F 9/5061
See application file for complete search history.

(56) References Cited

U.S. PATENT DOCUMENTS

| | | | | |
|---|---|---|---|---|
| 8,140,576 | B1* | 3/2012 | Viripaeff | G06F 21/6227 707/781 |
| 8,924,269 | B2* | 12/2014 | Seubert | G06Q 10/06 705/35 |
| 2007/0088741 | A1 | 4/2007 | Brooks et al. | |
| 2014/0380265 | A1* | 12/2014 | Driesen | G06F 8/70 717/101 |
| 2017/0177662 | A1* | 6/2017 | Lam | G06F 16/252 |

(Continued)

OTHER PUBLICATIONS

"ABAP Package Concept", retrieved from https://www.slideshare.net/ttrapp/abap-package-concept on or before Apr. 2018, 22 pp.

(Continued)

*Primary Examiner* — Usmaan Saeed
*Assistant Examiner* — Jessica N Le
(74) *Attorney, Agent, or Firm* — Klarquist Sparkman, LLP

(57) ABSTRACT

Techniques and solutions are described for facilitating the installation of software application extensions in a multi-tenant environment. A package for an extension may include code for a plurality of objects of the extension. Extension objects can be generated or non-generated. Generated objects can be user modifiable or not user modifiable. A software-implemented classification assistant can examine properties of the objects and classify them for deployment to a shared container or prompt a user to select whether an object should be deployed to the shared container or to a tenant-specific container. Properties of objects in the shared container may be set by the classification assistant such they are not modifiable by tenants.

20 Claims, 9 Drawing Sheets

(56) References Cited

U.S. PATENT DOCUMENTS

2018/0210727 A1* 7/2018 Elliott ................. G06F 8/71
2019/0129712 A1* 5/2019 Hawrylo .............. G06F 8/70

OTHER PUBLICATIONS

Campos, M., "How to Find and Activate Business Functions", retrieved from https://blogs.sap.com/2013/11/08/how-to-find-and-activate-business-functions/ Nov. 8, 2013, 7 pp.
"Creating Structure Packages", retrieved from https://help.sap.com/saphelp_nw73ehp1/helpdata/en/d0/97cc229d5411d596bc00a0c94260a5/content.htm?loaded_from_frameset=true on or before Apr. 2018, 2 pp.
"Data Loss after the upgrade", retrieved from https://wiki.scn.sap.com/wiki/display/SL/Data+Loss+after+the+upgrade on or before Apr. 2018, 3 pp.
"Enhancement Category of Structures", retrieved from https://help.sap.com/doc/abapdocu_750_index_htm/7.50/en-US/abenddic_structures_enh_cat.htm on or before Apr. 2018, 1 p.
"Genflag—Generation Flag", retrieved from https://www.consolut.com/s/sap-ides-access/d/s/doc/H-GENFLAG/ on or before Apr. 2018, 21 pp.
Kruse, E., "SAP S/4HANA Cloud SDK: FAQ", retrieved from https://blogs.sap.com/2017/07/28/sap-s4hana-cloud-sdk-faq/, Jul. 28, 2017, 5 pp.
"Multitenant Database Containers", retrieved from https://help.sap.com/viewer/6b94445c94ae495c83a19646e7c3fd56/2.0.00/en-US/623afd167e6b48bf956ebb7f2142f058.html on or before Apr. 2018, 2 pp.
"Next-Generation ERP Software", retrieved from https://www.sap.com/india/products/s4hana-erp.html on or before Apr. 2018, 12 pp.
"Object Directory", retrieved from https://help.sap.com/saphelp_sm71_sp14/helpdata/en/57/38e06c4eb711d182bf0000e829fbfe/content.htm?no_cache=true on or before Apr. 2018, 2 pp.
"Package Architecture in SAP ERP", retrieved from https://help.sap.com/saphelp_nw73ehp1/helpdata/en/fd/f39de8ae6f11d596c000a0c94260a5/content.htm?loaded_from_frameset=true on or before Apr. 2018, pp.
"#S4HANA Cloud use case series—The Collection", retrieved from https://blogs.sap.com/2017/03/04/s4hana-cloud-use-case-series-the-collection/ Mar. 4, 2017, 4 pp.
"SAP ABAP Data Element TROBJTYPE (Object Type)", retrieved from https://www.sapdatasheet.org/abap/dtel/trobjtype.html on or before Apr. 2018, 2 pp.
"SAP ABAP Domain Object (Object Type)", retrieved from https://www.sapdatasheet.org/abap/doma/object.html on or before Apr. 2018, 2 pp.
"SAP HANA", retrieved from https://en.wikipedia.org/wiki/SAP_HANA on or before Apr. 2018, 9 pp.
"SAP Table TADIR", retrieved from http://leanx.eu/en/sap/table/tadir.html on or before Apr. 2018, pp.
Sens, M.C."Upgrading SAP®", retrieved from https://books.google.com/books?id=jZ0bVVVCBdgC&pg=PA24&lpg=PA24&dq=sap+tadir+catalog&source=bl&ots=riNcWDUjaq&sig=P5D3oE85er4z7w388GPshX56rtQ&hl=en&sa=X&ved=2ahUKEwix5LLqi_nZAhVW42MKHSahDboQ6AEwBHoECAAQSg#v=onepage&q=sap%20tadir%20catalog&f=false on or before Apr. 2018, 9 pp.
Somuncu, A., "SAP HANA Multitenant Database Architecture", retrieved from https://blogs.sap.com/2016/11/15/sap-hana-multitenant-database-architecture/ Nov. 15, 2016, 10 pp.
Stevens, H., "SAP Add-On Assembly Kit", retrieved from https://blogs.sap.com/2016/03/22/sap-add-on-assembly-kit/ Mar. 22, 2017, 7 pp.
Stutenbaumer, T., excerpts from "Practical Guide to SAP ABAP Part 2: Performance, Enhancements, Transports", retrieved from https://books.google.com/books?id=LhgvDwAAQBAJ&pg=SA6-PA1&lpg=SA6-PA1&dq=tadir+sap+example&source=bl&ots=7O6dLglif&sig=yPOiAAyDqOt94vA3sn1CJkVyBSA&hl=en&sa=X&ved=2ahUKEwjr1Lyq1vnZAhVPHGMKHYUbC0sQ6AEwB3oECAAQZg#v=onepage&q=tadir%20sap on or before Apr. 2018, 4 pp.
"Switch Framework", retrieved from https://help.sap.com/saphelp_nw70/helpdata/EN/af/e8b540afc87c2ae10000000a155106/frameset.htm on or before Apr. 2018, pp.
"TADIR SAP Directory of Repository Objects Table" retrieved from http://www.se80.co.uk/saptables/t/tadi/tadir.htm on or before Apr. 2018, 4 pp.
"TADIR-Object Object Type SAP field attributes inc. TROBJTYPE Data Element", retrieved from http://www.se80.co.uk/saptabfields/t/tadi/tadir-object.htm on or before Apr. 2018, 4 pp.
"TDEVC SAP Packages Table", retrieved from http://www.se80.co.uk/saptables/t/tdev/tdevc.htm on or before Apr. 2018, 5 pp.
Trapp, T., "ABAP Package Concept Part 1—The Basics", retrieved from https://blogs.sap.com/2011/12/04/abap-package-concept-part-1-the-basics/ Dec. 4, 2011, 7 pp.
"What every SAP consultant must know about business functions and activating them", retrieved from http://sapcrmcorner.blogspot.com/2016/05/activating-sap-business-functions.html on or before Apr. 2018, pp.
"What is SAP S/4HANA? 13 Questions Answered", retrieved from https://news.sap.com/what-is-sap-s4hana-13-questions-answered/ on or before Apr. 2018, 14 pp.
"What is TADIR entry?", retrieved from https://archive.sap.com/discussions/thread/755435 on or before Apr. 2018, 5 pp.
"What's your #SAPinnovation story?", retrieved from https://www.sap.com/india/products/hana.html on or before Apr. 2018, 11 pp.
European Search Report received in counterpart European Application No. 19166485.3, dated Sep. 13, 2019, 10 pages.
Krebs et al., "Platform-as-a-Service Architecture for Performance Isolated Multi-tenant Applications," 2014 IEEE 7$^{th}$ International Conference on Cloud Computing, IEEE, Jun. 27, 2014, pp. 914-921.

* cited by examiner

| Object Identifier | Execution location | Result Location | Additional Processing |
|---|---|---|---|
| XYZ | /shared/partnerX/extensionA | /tenantA/DB/moduleX/result | /append/moduleX/result |
| DEF | /shared/partnerX/extensionB | NULL | NULL |
| GHI | /shared/partnerY/extension1 | tenantA/DB/extension1/result | /methods/moduleX/postcalc |

| Object Name | Object Type | Source Location | Package | Owner | Generation Identifier |
|---|---|---|---|---|---|
| | 510 | 514 | 518 | 522 | 526 | 530 |
| XYZ | PROG | shared/extensions/partner1/ext1/ | ExtensionA | Partner1 | NULL |
| DEF | CLAS | shared/extensions/partner2/extA/ | SuperCalculationExtension | Partner2 | X |
| GHI | DEVC | shared/extensions/Garima/ext1B/ | 1BX3 | Garima | Z |

| Package | Type | Enhanceable? |
|---|---|---|
| 610 | 614 | 618 |
| ExtensionA | O | YES |
| SuperCalculationExtension | C | NO |
| 1BX3 | H | YES |

FIG. 6

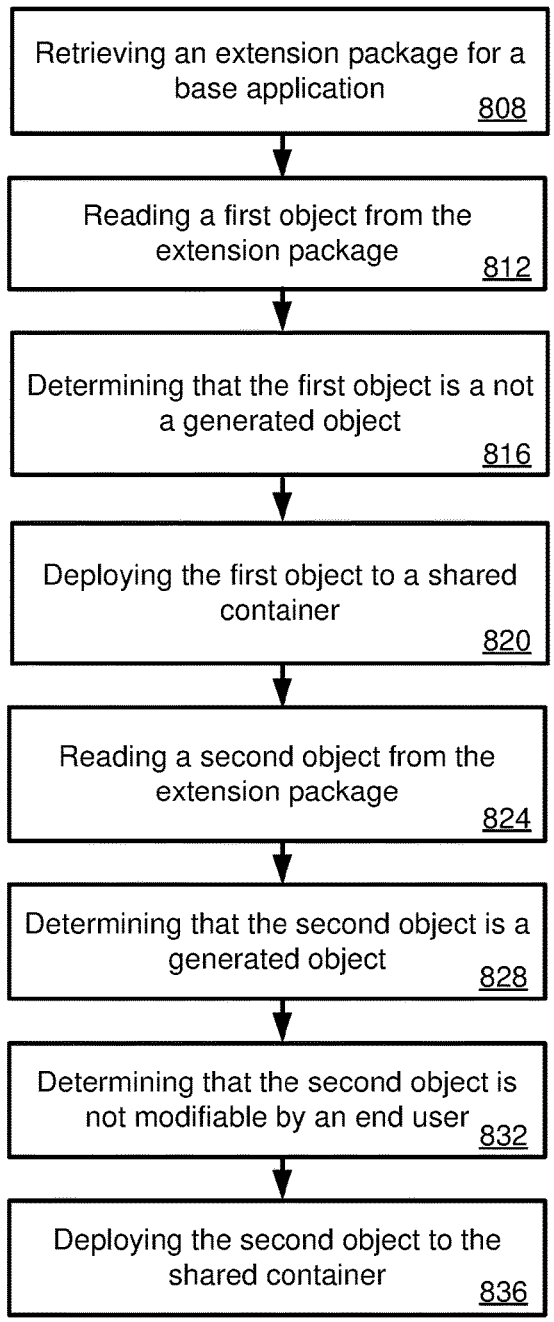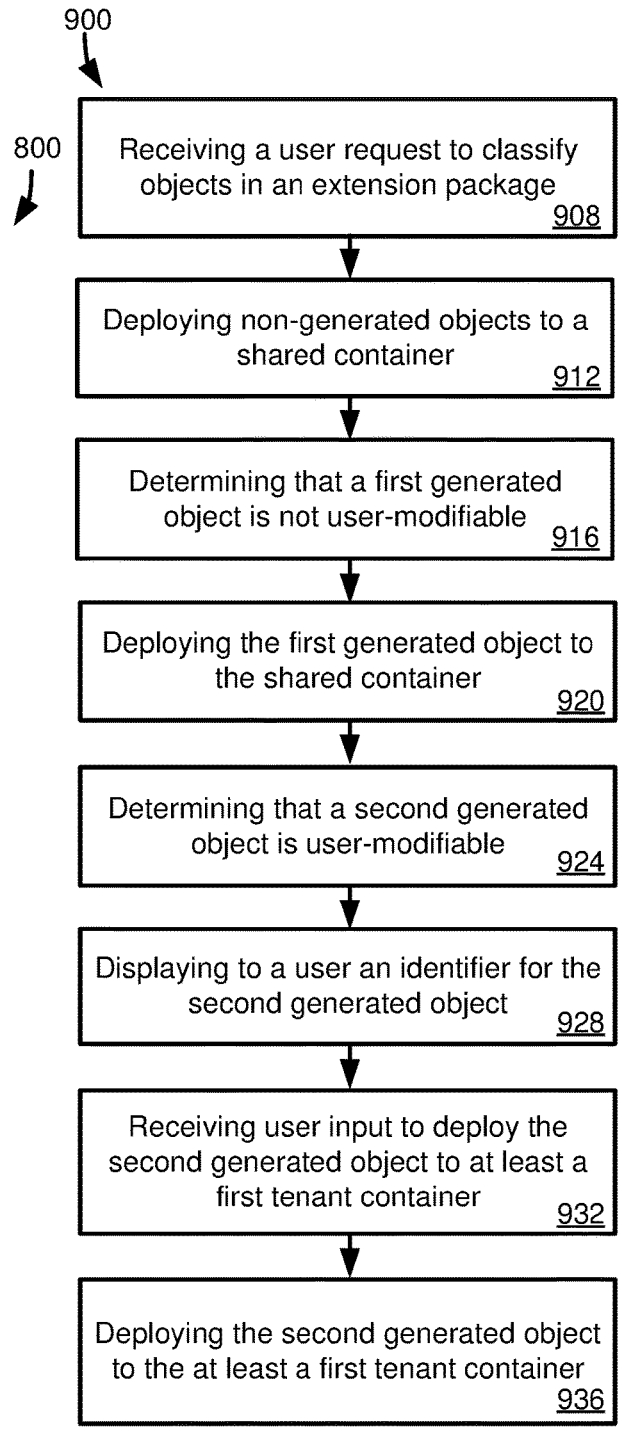
FIG. 8
FIG. 9

CLASSIFICATION AND DISTRIBUTION OF EXTENSION OBJECTS IN MULTITENANT ENVIRONMENTS

FIELD

The present disclosure generally relates to managing application components in a multitenant database environment. Particular examples relate to classifying objects in a package for an application extension for deployment to a shared container or one or more tenant containers.

BACKGROUND

Multitenant database systems are becoming increasingly common, particularly in cloud deployments. Multitenant environments can provide a number of advantages, including reducing hardware and maintenance costs for users (tenants). In a multitenant environment, some resources, such as documentation, a centralized code base, and at least certain runtime and configuration data, are typically shared by multiple tenants. However, challenges can exist in implementing application extensions from non-multitenant environments in multitenant environments. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the installation of software application extensions in a multitenant environment. A package for an extension may include code for a plurality of objects of the extension. Extension objects can be generated or non-generated. Generated objects can be user modifiable or not user modifiable. A software-implemented classification assistant can examine properties of the objects and classify them for deployment to a shared container or prompt a user to select whether an object should be deployed to the shared container or to a tenant-specific container. Properties of objects in the shared container may be set by the classification assistant such they are not modifiable by tenants.

In one aspect, a method is provided for classifying objects in an extension package for deployment in a multitenant environment. An extension package, or add on package, for a base application is retrieved. The package includes code defining a plurality of objects. A first object of the plurality of objects is read from the package. It is determined that the first object is not a generated object. The determining can be carried out, for example, by accessing metadata or configuration data for the first object. Based on determining that the first object is not a generated object, the first object is deployed to a shared container in the multitenant environment.

A second object of the plurality of objects is read from the package. It is determined that the second object is a generated object. It is determined that the second object is not modifiable by an end user. The determining of whether the object is generated or user-modifiable may be carried out, for example, by accessing metadata or configuration data for the second object. Based on determining that the second object is not modifiable by an end user, the second object is deployed to the shared container.

In another aspect, another disclosed method provides for classifying objects in a package for an application extension or add on for deployment in a multitenant environment. The multitenant environment includes a shared container, accessible by one or more tenants, and one or more tenant containers. The package includes one or more non-generated objects and at least first and second generated objects.

A request is received from a user to classify objects in the package. Non-generated objects are deployed, or marked for deployment, to the shared container. It is determined that the first generated object is not user-modifiable. Based on the determining, the first generated object is deployed, or marked for deployment, to the shared container. It is determined that the second generated object is user modifiable. Based on the determining, an identifier for the second generated object is displayed to a user. User input is received to deploy the second generated object to at least a first tenant container of the one or more tenant containers. The second object is deployed, or marked for deployment, to the at least a first tenant container.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 is an example table for storing object execution configuration information.

FIG. 5 is an example table for storing object metadata.

FIG. 6 is an example table for storing package metadata.

FIG. 8 is another flowchart of example operations in classifying objects in an extension package for deployment to a shared container or one or more tenant containers.

FIG. 9 is a further flowchart of example operations in classifying objects in an extension package for deployment to a shared container or one or more tenant containers.

DETAILED DESCRIPTION

Example 1—Overview

Multitenant database systems are becoming increasingly common, particularly in cloud deployments. Multitenant environments can provide a number of advantages, including reducing hardware and maintenance costs for users (tenants). In a multitenant environment, some resources, such as documentation, a centralized code base, and at least certain runtime and configuration data, are typically shared by multiple tenants. Other resources, such as applications, application components, or data, may be tenant-specific and stored in a tenant container.

Similar scenarios may exist in other contexts. For instance, a large organization may have multiple systems (e.g., development, test, and production systems) that share resources (e.g., a software stack). Other components of the systems may differ, and thus can be analogous to tenants in a multitenant architecture. Similarly, a large organization may maintain common resources, but have distinct resources for particular regions, operating units, facilities, etc., which can be similar to tenants in a multitenant architecture.

In some cases, a software application that was provided as a unique installation for a particular user (e.g., an "on premise" installation) can be changed to an application with one or more (including all) components being shared between multiple tenants, such as in a cloud deployment. Tenants can be different, unrelated entities, or can be, for example, defined for different units of a common entity.

Figure 1:
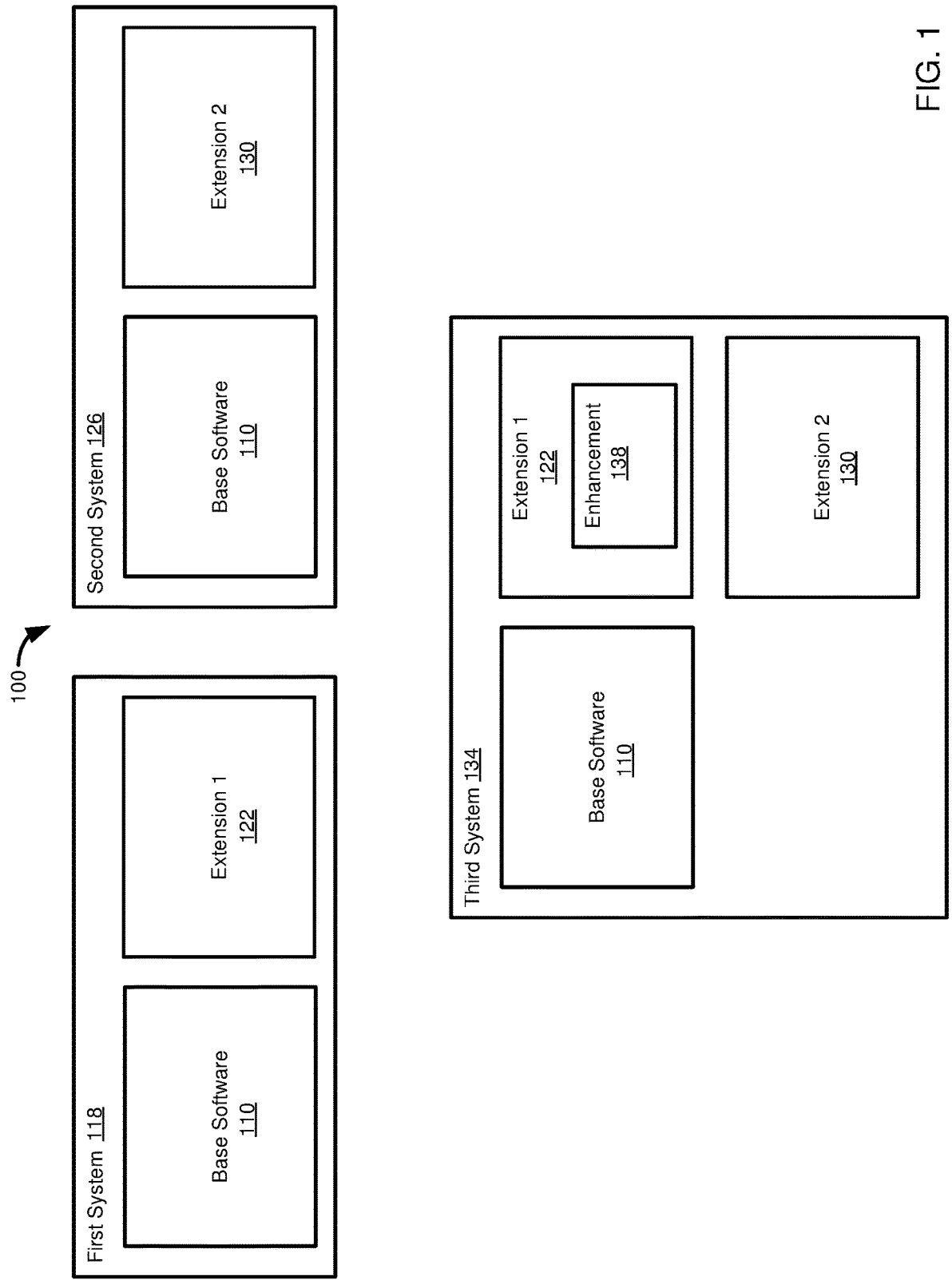
FIG. 1 is a diagram illustrating architectural options for deploying applications, application extensions, and enhancements to application extensions, in a non-multitenant environment.

Migration to a multitenant architecture can be problematic if the software application can be used with additional components that were not designed to be used in a multitenant environment. In some cases, a software application can provide general functionality that may be useful to a range of different users. However, other software applications or modules may be developed to extend the capabilities of the software application, including based on particular needs of particular types or classes of users, or to meet the needs of different individual users. For example, as shown in FIG. 1, a computing environment 100 can include base software 110. The base software 110 can be a platform or suite of software applications. In a particular example, the base software 110 can be the S/4 HANA product of SAP SE, of Walldorf, Germany.

A first user associated with a first computing system 118 may have particular needs such that a first extension 122 is developed and installed alongside the base software 110. A second user associated with a second computing system 126 may have particular needs such that a second extension 130 is developed and installed alongside the base software 110. In a typical, non-multitenant deployment, an arbitrary user has a dedicated installation of the base software 110 and can optionally install the first extension 122, the second extension 130, or any other extension that the user may find helpful. In some cases, the first and second extensions 122, 130 can be written in the same programming language as the base software 110, or can otherwise leverage functionality of the base software 110.

FIG. 1 also illustrates a third computing system 134 that may be used by a third user. The third computing system 134 includes the base software 110, the first extension 122, and the second extension 130. In some cases, at least a portion of an extension may be modifiable by an end user. In the case of the third user, the third user has created an enhancement 138 to the first extension 122. Enhancements 138 may take various forms, but can be, for example, the addition of additional computational logic (e.g., processing steps added to a base method of the base software 110 or a base method of an extension, such as the first extension 122) or the addition of one or more fields to standard tables provided by the base software or an extension.

Figure 2:
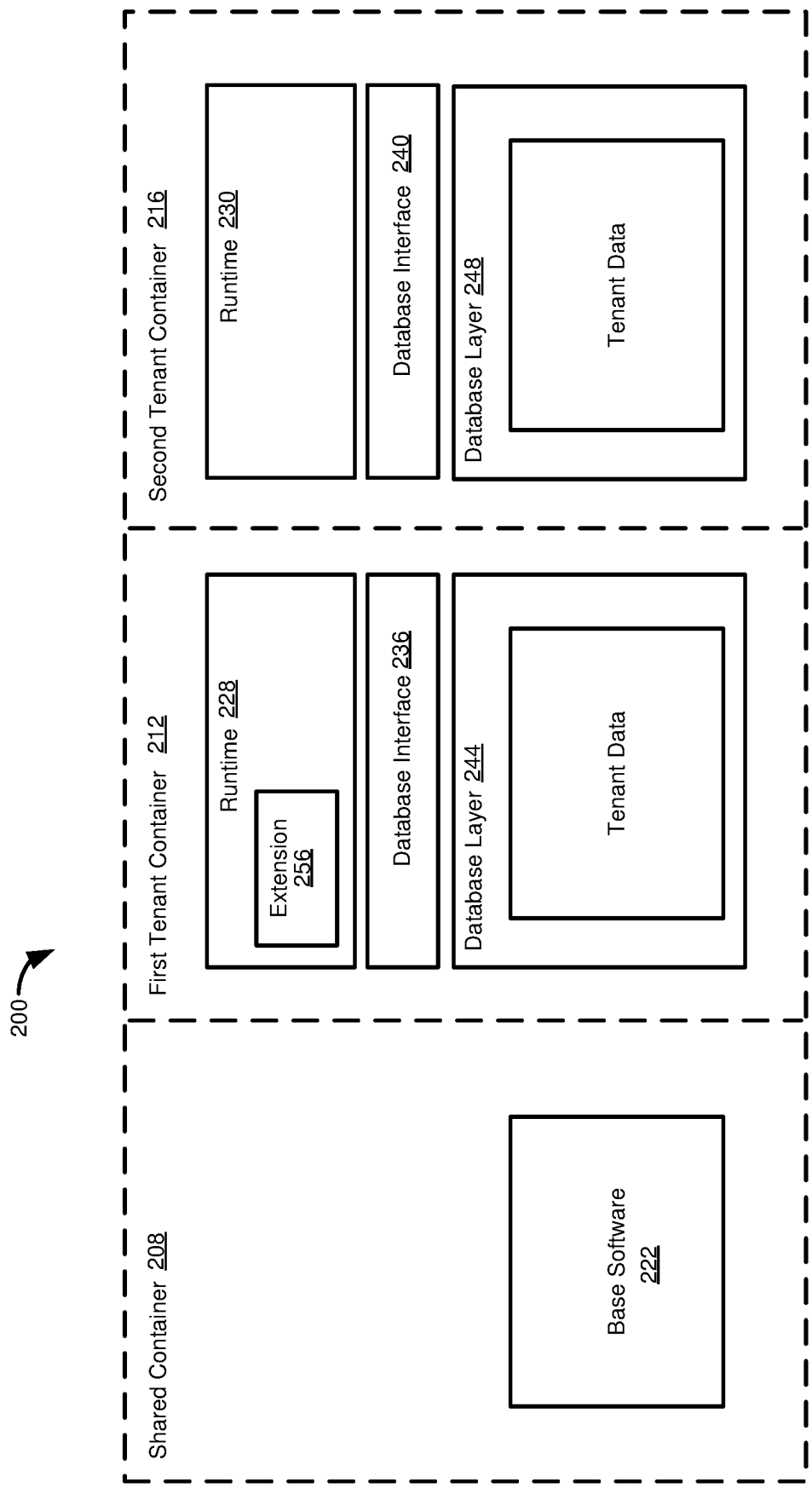
FIG. 2 is a diagram illustrating how application extensions can be implemented in tenant containers of a multitenant database environment.

FIG. 2 illustrates a multitenant environment 200, such a cloud environment, having a shared container 208, a first tenant container 212, and a second tenant container 216. The shared container 208 can include a base software application 222. The base software application 222 can be, can be a version of, or can provide similar functionality to, the base software 110 of FIG. 1. The first and second tenant containers 212, 216 can access the base software application 222, such as through respective application runtimes 228, 230. Each tenant container 212, 216 can also be associated with respective database interfaces 236, 240, which can be used to access data stored in respective database layers 244, 248 of the tenant containers.

As the shared container 208 is accessible by both the first tenant container 212 and the second tenant container 216, providing additional functionality cannot typically be provided in the manner shown in FIG. 1, at least not without the possibility of causing issues. For instance, if the base software application 222 is developed by a first entity, and an extension is developed by a second entity, the first entity may be subject to liability in the event a tenant 212, 216 uses an extension that is incorporated into the base software application. In addition, it can be difficult to segregate access to the extension if it is included in the base software application 222, such as if a first tenant, associated with the first tenant container 212, paid for access to the extension but a second tenant, associated with the second tenant container 216, did not.

In some cases, it may be possible for an extension 256 to be provided that can be executed from a tenant container, such as the first tenant container 212. In a particular example, an extension may have originally been provided in the environment 100 of FIG. 1, and written in a language corresponding to a language in which the base software application is written. In the environment 200, a SDK can be provided for authorizing extensions that can be used by a tenant container 212, 216 in conjunction with the base software application 222. However, in at least some cases, the SDK may be in a language other than a language in which at least certain functionality of the base software application 222 is written, which can increase the complexity of the extension or can reduce the functionality of the extension. Accordingly, it can be beneficial to provide a solution where an extension can be used in a multitenant architecture, such as in a cloud deployment, but use legacy code from a non-multitenant environment or otherwise leverage functionality of the base software application 222 in a similar manner as the on premise/non-multitenant environment 100 of FIG. 1.

The present disclosure provides solutions allowing the use of extensions in a multitenant environment. The extensions can be extensions that were not written for a multitenant environment, including legacy code, extensions written to take advantage of functionality of the base software application 222, or other extensions for the base software application.

The solutions can be realized by incorporating an extension repository into a shared container of a multitenant database system. Extensions in the extension repository can be separated from a base software application, which can reduce liability for an entity providing the base software application. Separating the extensions from the base software application can also simplify update and maintenance of the base software application, as well as the extensions. Separating the extensions from the base software application can increase security of the extensions by assisting in restricting access to the extensions to particular authorized users or entities, such as by modifying the extensions.

Facilitating the development or reuse of extensions can provide other advantages. For example, a multitenant architecture may provide advantages to a user in terms of cost, convenience, and performance. However, if a user relies on extensions, the user may be reluctant to switch to a multitenant architecture if the user has one or more extensions that may become unusable. In turn, a developer may be reluctant to recreate functionality in an extension, such as in a different programming language, due to the large volume of work that can be required, or the loss of inoperability with support services of the base software application.

Rights to access and modify data can be restricted in a multitenant architecture. For example, tenants maybe prevented from modifying data (such as method implementations) in the extension repository. To maintain data integrity of the tenant containers, entities associated with extensions in the extension repository can be prevented from accessing or modifying tenant data. Tenant data can represent results of actions taken using extensions from the extension repository. In at least some aspects, a tenant container can include additional logic or functionality associated with extensions. For example, an extension may indicate that certain features can extended or augmented by a tenant.

The present disclosure also provides technologies that can assist in migrating an extension to a multitenant environment. An extension can be associated with various objects, such as classes or similar abstract data types, or other elements of object oriented programming. Some objects can be compile-time objects. Compile-time objects are typically not modifiable by a tenant, and thus can be stored in the repository of the shared container.

Other objects can be generated objects, objects that are generated during runtime in response to user actions (e.g., activation of program features via a user interface element). Some generated objects can be automatically classified for inclusion in the shared repository. Other generated objects can be designated for installation/instantiation in a local tenant container, or can be flagged for a user (e.g., a system administrator or software developer) to manually determine whether the object should be installed in the shared repository or a tenant-local container. In some aspects, if an object can be modified by a tenant, it is installed or instantiated in the tenant-local container, or the object is flagged for a user to determine to which location the object should be installed. In some cases, a user may be provided an option to change a type of the object, or to change whether the object is tenant-modifiable.

Providing a migration assistant can assist software developers in migrating their extensions to a new environment, such as a multitenant environment, which can be provided in the cloud. Providing a migration assistant can also help a developer of a base application maintain control over the shared container, such as by restricting access of developers associated with extensions to the shared extension repository, and not providing access to the base software application.

Example 2—Example Multitenant Environment

Figure 3:
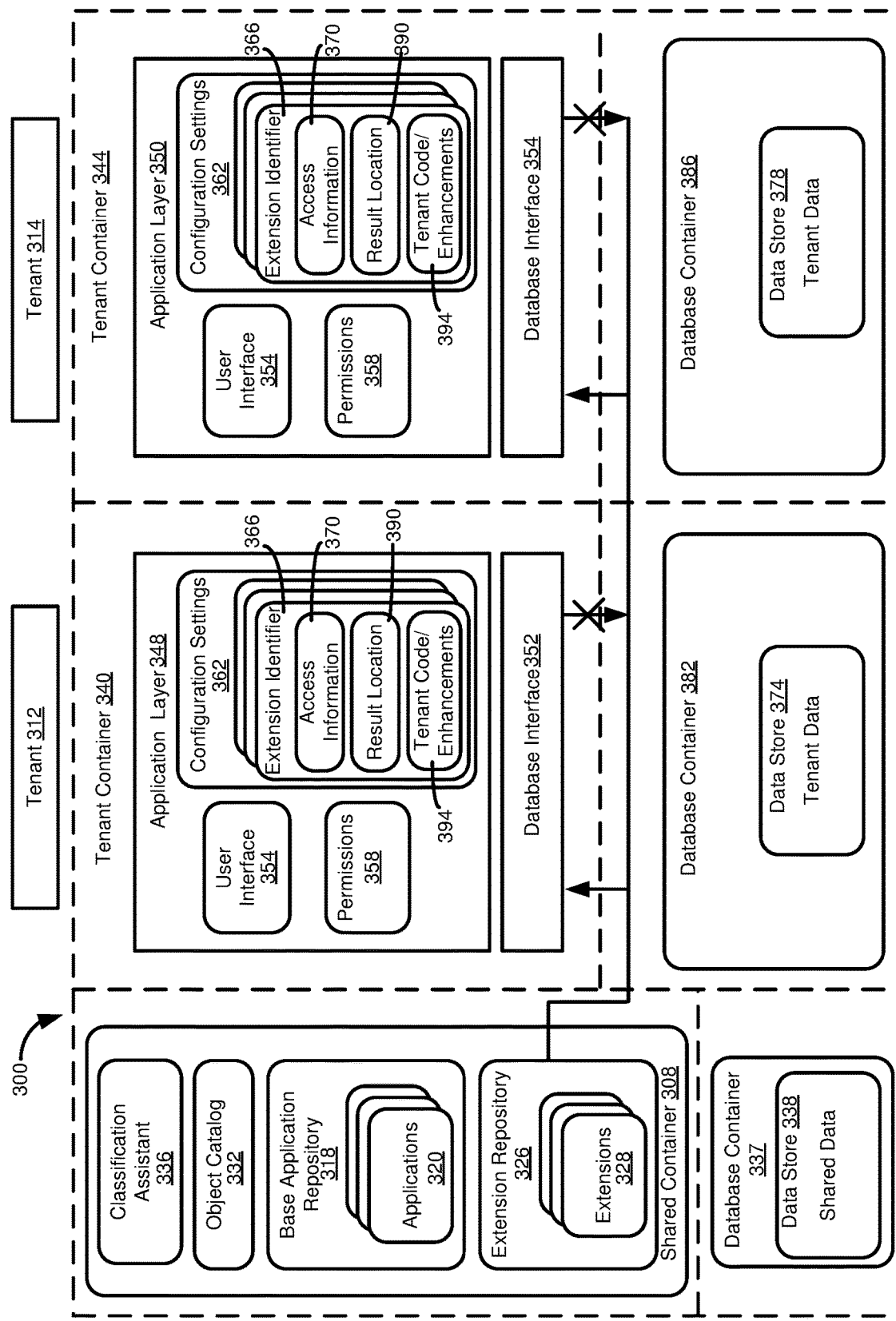
FIG. 3 is a diagram illustrating a multitenant database environment where components of application extensions can be distributed between a shared container and one or more tenant containers.

FIG. 3 illustrates a multitenant database environment 300. The environment 300 includes a shared container 308 that can be accessed by a first tenant 312 and a second tenant 314. Although first 312 and second 314 tenants are shown, an environment 300 can include a larger or smaller number of tenants.

The shared container 308 can include a base application repository 318 and an extension repository 326. The base application repository 318 can include one or more software applications 320 that can be provided to one or both of the first and second tenants 312, 314. Typically, the base application repository 318 includes applications 320 having more general functionality that is useable by multiple tenants.

The extension repository 326 can include code for one or more extensions 328 to one or more applications 320 in the base application repository 318. Typically, extensions 328 provided enhanced functionality for an application 320, such as providing additional methods that can be called by an application, but can optionally provide more extensive functionality, including user interface screens or user interface elements that can provide access to features of the extensions. The extensions 328 can also take the form of plugins or applets for an application 320.

Typically, the base application repository 318 and the extension repository 326 are provided in logically separated portions of the shared container 308. In this way, a provider of the shared container 308 can allow third parties access to, or at least allow third party software to operate in, the extension repository 326, but not to access the base application repository 318 or other portions of the shared container (such as configuration settings). This arrangement can thus provide greater security and stability for the shared container 308, and separate application functionality that may be provided by different parties.

In addition to restricting access to the base application repository 318, the shared container 308 can restrict access to the extension repository 326, and extensions 328 thereof. For example, the shared container 308 can incorporate access and permission features such that only a developer or other authorized entity can add, delete, or modify extensions 328 in the extension repository 326. For example, each developer may be provided with access credentials, and optionally access permissions or a particular namespace in the extension repository 326 or other components of the shared container 308, such that their extensions 328 are protected from access by developers of other extensions stored in the extension repository. Thus, just as the base application repository 318 is logically separated from the extension repository 326, each developer or other entity associated with access credentials can be provided with access to logically separated portions of the extension repository.

The shared container 308 can include additional features. For example, the shared container can contain an object catalog 332. The object catalog 332 can include information regarding various applications 320, extensions 328 or other add-ons to the applications 320, and other objects used in the shared container 308, and in some cases in the various tenant containers 340, 344.

For example, an extension 328 may be provided in the form of a package that has one or more associated program objects. The object catalog 332 can store various information about the objects, as well as the packages, including whether the object is a generated object (generated when needed in response to user actions with an application 320 or an extension 328) or a compile-time object, which can be an object that is instantiated when an application or extension is initially deployed or installed. In turn, generated objects may be associated with indicators specifying whether the generated object is editable or enhanceable by an end user (e.g., a tenant 312, 314) or is restricted from such editing.

Generated objects may be associated with additional information, including identifiers for entities or users permitted to remove or modify the object, or identifiers for entities or users permitted to access or activate the object (for example, call methods, including through an API, provided by the object or a package associated with the object). The object catalog 332 can store this information in the form of metadata about the objects, including in a table that lists various properties of the object.

As will be further described, a package for an extension 328, and its constituent objects, may have been originally developed for a non-multitenant environment. In order to adapt an extension 328 for use in the multitenant environment, typically the objects in the package should be classified to determine whether they should be deployed to the shared container 308 or one or more of tenant containers 340, 344, respectively associated with the tenants 312, 314. However, a developer of an extension 328 may be unfamiliar with the configuration of the shared container 308, or the multitenant architecture 300 in general. Thus, it may be difficult for the developer to classify objects in an extension 328. Further, a provider of the base applications 320, the shared container 308, or the multitenant architecture 300 in general may wish to restrict access to configuration settings and other properties of the shared container.

Accordingly, the shared container 308 can include a classification assistant 336. The classification assistant 336 can assist a developer of an extension 328 in classifying objects in the extension for placement in the extension repository 326 or in a tenant container 340, 344. For example, if common functionality should be provided for multiple tenants 312, 314, typically the corresponding object or objects are placed in the extension repository 326, and tenants are restricted from modifying them. If all or a portion of functionality for an enhancement 328 should be modifiable by a tenant 312, 314, the corresponding object or objects can be deployed to the appropriate tenant container 340, 344.

The shared container 308 can access a database container 337 (which can be accessed using a database interface, not shown). The database container 337 can include one or more data stores 338. The one or more data stores 338 can store data associated with the shared container 308, including data objects, data tables, and other data associated with the applications 320, the extensions 328, or objects of the object catalog 332.

Objects in the tenant containers 312, 314 can cooperate with objects in the shared container 308 to provide the same or equivalent functionality to an extension 328 executed in a non-multitenant environment. While the present disclosure describes migration of extensions 328 from a non-multitenant environment to the multitenant environment 300, it should be appreciated that aspects of the present disclosure, including the classification assistant 336, can be used in other contexts.

For example, it may be possible for a tenant container 340, 344 to directly incorporate an extension, in a similar manner as shown in FIG. 2. However, as has been described, there can be advantages to having all or a portion of the extension be implemented in association with applications 320 of the base application repository 318, including the ability to use a common programming language or to leverage components or functionality of the applications 320. Thus, it may be desirable to create or update extensions 328 using the architecture 300, including the classification assistant 336, rather than creating extensions implemented in another manner.

The tenants 312, 314 are associated with respective tenant containers 340, 344. Each tenant container 340, 344 can include an application layer 348, 350 and a database interface 352, 354. The application layers 348, 350 can serve applications for a tenant 312, 314. The application layers 348, 350, can include a user interface component 354 that can provide information to, and receive input from, users associated with a respective tenant 312, 314.

The application layers 348, 350 can also include a permissions store 358. The permission store 358 can include information specifying one or both of which applications 320 of the base application repository 318 and extensions 328 of the extension repository 326 a tenant 312, 314 may access. In some implementations the permissions store 358 may be omitted. A tenant 312, 314, or individual users associated with a tenant, may be associated with one or more identifiers that are in turn associated with access permissions for applications 320 or extensions 328 of the shared container 308.

The application layers 348, 350 can include extension configuration settings 362. The configuration settings 362 can specify what extensions 328 of the extension repository 326 should be called in response to particular user actions, such as user actions received through the user interface 354. For example, a particular function of a base application 320 may be registered with an extension 328. For such a function, the configuration settings 362 can include an extension identifier 366, such as a name or numeric or alphanumeric identifier, corresponding to an extension 328 and access information 370 for accessing the extension. The access information 370 can be a file path or URI for the shared container 308, such as to access an object (or package, or other component associated with an extension 328) in the extension repository 326.

In some cases, when functionality of an extension 328 is called by a tenant 312, 314, any results can be immediately used during the runtime of an application in the application layer 348, 350. In other cases, the result can be stored, optionally in addition to being returned to the application runtime. For example, results can be stored in a table or other data store 374, 378 of a database container 382, 386 of a respective tenant container 340, 344. The configuration settings 362 for an extension associated with an identifier 366 can include result locations 390, which can be a path to the storage location, such as a table in the data store 374, 378, or other information useable to store information (for example, formatting the results into a SQL statement, such as to insert, update, or delete a record, that can update records of a table in the data store 374, 378).

As described, providing the tenants 312, 314 with access to the extensions 328 can provide customized applications that are more useful for the needs of particular tenants. In at least some cases, the functionality provided to a particular tenant 312, 314 can be further customized. For example, an extension 328 may allow a tenant 312, 314 to enhance or customize functionality of the extension 328. Tenant code enhancements or customizations 394 can be identified in the configuration settings 362.

The tenant containers 340, 344 can include repositories (not shown) that can store code or configuration information for any such enhancements or customizations 394. In further aspects, tenant enhancements 394 can be stored in the database container 382, 386, such as being defined in a data dictionary for the database container 382, 386. In particular aspects, the data dictionary can include schema extensions to standard database tables provided as part of an application 320 or an extension 328.

The database interfaces 352, 354 can coordinate database operations, including execution of read and write requests from the tenants 312, 314. The database interfaces 352, 354 can also perform tasks such as handling execution errors, such as SQL exceptions, enforcing access restrictions or sharing permissions (including accessing data that might be stored in the shared container 308), or carrying out various database management activities.

As described above, the environment 300 can allow extensions 328 to be provided without allowing third parties to modify the applications 320. Similarly, the environment 300 can prevent third parties (e.g., entities providing an extension 328) from accessing data of the tenants 312, 314, such as by storing results or other tenant data in the data stores 374, 378 rather than in the shared container 308. However, functionality of the extensions 328 can be protected from modification by the tenants 312, 314 by maintaining the extensions in the shared container 308. That is, the tenants 312, 314 can be allowed read access to the extensions 328, but not write access.

As an example of how data can pass between a tenant 312, 314 and the shared container 308, an extension 328 may take the form of a calculation that may be specific to the particular industry of the tenant 312. As an industry specific calculation, the functionality may not be provided by a base application 320. The permissions store 358 may provide access rights to the corresponding extension 328 of the extension repository 326. When an associated process is invoked, the configuration settings 362 can be accessed to direct the method invocation to the appropriate location in the extension store 326 using the access information 370.

Arguments associated with the method invocation can be passed to the shared container 308, where the calculation is performed. Results of the calculation are returned to the tenant 312, and optionally stored in the data store 374 at a location indicated in the result location 390 of the configuration settings 362. Optionally, additional processes can be carried out based on any tenant customizations/enhancements indicated in the enhancements/customizations 394 of the configuration settings 340. For example, an enhancement may be a further calculation that is performed on the result of the calculation at the shared container 308.

Example 3—Example Tenant Object Configuration

FIG. 4 illustrates an example table 400 that can store configuration information that can be stored in a tenant container, such as the tenant container 340 or 344 of FIG. 3, for accessing an extension 326 located in a shared container 308 of the multitenant environment 300. The table 400 can store object identifiers 410 for various objects associated with an extension 326, such as particular methods or APIs of the object (or a package containing the object). A record for each object identifier 410 can include an execution location 414. The execution location 414 can be a file path, URI, or other identifier of a location where the function can be called at the shared container 308.

Optionally, the record for each function identifier 410 can include a result location identifier 418. The result location identifier 418 can identify a particular storage location in a data store 374, 378 of a database container 382, 386 of a tenant 312, 314. In other cases, the storage location can be specified in another manner, such as in the form of one or more SQL statements (e.g., update, insert, or delete statements) to modify one or more specified database tables.

A field 422 can specify any tenant-specific additional processing that may be carried out as part of executing the object indicated by the object identifier 410. The additional processing can represent tenant-specific processing for extensions 328 of the shared container 308 that allow for customization by a tenant. The additional processing can be, for example, an identifier of another function to be called, such as a location where corresponding code can be called (such as a repository location, a URI, or similar information). The additional processing can relate to additional fields that maybe associated with standard tables provided by a base application 320 or an extension 328.

However, the present disclosure is not limited to object information being stored in a table having the form of table 400, or being stored in tablular format. For example, similar information can be stored in configuration settings, such as configuration settings that can be loaded from a configuration file. In some cases, all or a portion of the information from the table 400 can be stored in the shared container 308, in addition to, or in place of, storing the information in a tenant container 340, 344.

Example 4—Example Object Metadata

FIG. 5 illustrates a table 500 that can store information regarding extensions, such as extensions 328 of the extension repository 326 of FIG. 3. The table 500 can be useful in configuring a shared container 308, such as determining what objects should be included in the shared container, and which, if any, objects should be deployed to a tenant container 340, 344.

The table 500 can include object identifiers 510, such as a name, or a numeric or alphanumeric identifier, for various objects that can be associated with an extension. That is, a particular extension may include one object or a plurality of objects, such as including the object or objects in a package. The value of the field 510 can identify an object in a directory or repository of available objects (which can include local objects and remote objects, such as objects located on a shared container, if the table 500 is associated with a tenant container 340, 344, or in a tenant container, if the table is located in the shared container 308).

Each object can be associated by a type indicated using particular values for an object type field 514. Object types can include programs (PROG), classes (CLAS), enhancements (ENGO), and development packages (DEVC), which, in particular examples, can be implemented as in products provided by SAP SE, of Walldorf, Germany.

Each object can include a location indicated by a value in a source location field 518. The value of the source location field 518 can include a path, URI, or other indicator for a source system for the object. In at least some cases, the value in the source location field 518 can be used to access the object. For example, the value in the source location field 518 can specify a particular location in the extension repository 326. In other cases, the value in the source location field 518 can specify a computing system associated with a provider of an extension with which the particular object is associated.

A package field 522 can identify a particular package to which the object belongs. A package can include classes (or other objects or abstract data types), function modules, data elements, as well as other packages (i.e., a package can be a subpackage included in another package). A package can define an interface for accessing functionality of the constituent package components. In some cases, a package can include a base application 320 and one or more extensions 328. In other cases, a package can include one or more extensions, where the package may be installed or activated for use with one or more base applications. Values of the package field 522 can be used, for example, to group objects by extension. For instance, when objects of a particular extension (which can correspond to a package identifier 522), are to be classified (or deposited in a shared container, such as in an extension repository), the objects can be retrieved by querying the table 500 by one or more values of the package identifier field 522.

The table 500 can include an owner field 526. Values of the owner field 526 can be used to identify objects associated with particular entities. For example, a first entity may "own" a first extension and a second owner may "own" a second extension. Including an owner field 526 can allow entities to retrieve objects associated with their extensions.

The owner field 526 can also be used to enforce access permissions. That is, a particular entity can be restricted to accessing, and modifying, records for which they are the owner. However, access permissions can specified in another manner, such as designating particular record ranges as being owned by different entities. Or, separate tables 500 may be provided for each owner (and can also be provided, for example, for each extension).

The table 500 can include a generation identifier field 530. The generation identifier field 530 can indicate whether an object is a generated object (e.g., generated during runtime, as opposed to a compile-time object that is created during software installation) and, at least in some cases, a type associated with the generated object. For example, the generation identifier field 530 can indicate whether the object is a generated object that should be maintained in the shared container as read-only with respect to the tenants, or if it is an object that should be editable by the tenants, and therefore typically installed in a tenant container. As will be further explained, the generation identifier field 530 can be useful in migrating or otherwise installing an extension for use in a multitenant environment, such as the environment 300 of FIG. 3.

Although various values can be used to indicate a generation status, in a particular example, a NULL or empty value (sometimes referred to as "space") can indicate that an object is not a generated object (such as being a default or compile-time object). Another value, such as "X", can be used to indicate that the object is a generated object. In some cases, a value of "X" can indicate that the generated object is modifiable by a tenant, and should be installed in the tenant container. Another value, such as "Z", can indicate that the generated object should be treated as a shared object, and not installed on the tenant container or made modifiable by a tenant. Of course, other values or means of classifying the generation status of an object can be used. Similarly, objects may have more or fewer generation types. For instance, rather than distinguishing between types of generated objects, a single value can identify whether an object is generated or not, and a user can manually determine whether the object should be shared or tenant-local, or such a determination can be made automatically using other properties of the object or its associated package.

As will be further discussed, in some cases, two values can be used for the generation identifier 530, indicating whether an object is generated or not. However, objects from a non-multitenant architecture may initially have values for the generation identifier that may not be appropriate for a multitenant architecture such that it may not be appropriate to treat all generated objects as being either shared or tenant-local. That is, in the non-multitenant architecture, classifying the object as generated or not may have been used for other purposes, but not for indicating where the object should be deployed in multitenant environment.

For example, some objects may be marked as generated, even though they should be treated as non-modifiable by a tenant. Thus, it may be useful to manually classify generated objects to ensure they are installed at the correct location, or to distinguish between types of generated objects (e.g., based on different type identifiers of the generated objects, or whether another field or metadata property associated with a generated objected indicates that it is modifiable or enhanceable by an end user).

The present disclosure provides procedures for changing the value of the generation identifier field 530 for an object, such as changing a value for a generated object (e.g., having a value of "X") to a value indicating that the object should be shared, and not modifiable by a tenant. The change can be reflected by changing the "X" to another value, such as NULL, "space"/"blank", or "T". In other cases, an object can be installed to the correct location without modifying the value in the generation identifier field 530. Thus, the values of the generation identifier field 530 can be used to help guide an entity, such as an extension provider, to set up an extension in a multitenant environment, as described herein.

Example 5—Example Package Metadata

Other object or package metadata can be used to enforce access permissions, such as preventing tenants from editing objects in a shared container. Examples of such metadata are provided in table 600, shown in FIG. 6. The table 600 includes a package identifier field 610. The package identifier field 610 can be used to identify a package, which can correspond to a particular extension provided by a particular entity. In particular examples, the package identifier field 610 can correspond to the package identifier field 522 of FIG. 5.

Each package can be associated with a type indicated in a type field 614. Values of the type field 614 can include values such as "C", for a cloud package, "D" for a deprecated package, "H" for a home package, and "O" for an on-premise package. In some implementations, the "O" designation can be used to designate that packages should be located in the shared container and not editable by tenants. That is, the "O" designator can be used to specify a particular location for the package in a multitenant environment, which can be a cloud environment, rather than strictly specifying whether the package is cloud-deployed, or not cloud-deployed. Of course, if desired, another designator could be used for the shareable container, such as providing a value of "S".

Although described as being applied at a package level, in some aspects, the type field 614 can be associated with individual package objects. For example, a type field can be included in the table 500. Having a type field, or similar designator, in the table 500 can be useful, for example, when it is desired to classify an object as a generated object (e.g., type "X") in field 530, but still specify that a tenant may not modify the object. Designators may also be used to specify other combinations of object locations and object editability. For instance, it may be desirable to have an object installed in a tenant container, but not editable by the tenant.

Packages can also be associated with a value for an enhanceability field 618. The enhanceability field 618 can be used to indicate whether a package, or package components (e.g., objects), can be extended by an end user (e.g., a tenant). For example, an enhanceable package may allow a user to add additional processing logic to the extension.

Typical values for the enhanceability field 618 can include "1" and "0" for "enhanceable" or "not enhanceable," respectively, "Yes", "No", "True", "False" or similar designators. Although shown as part of the table 600, in some cases, the enhanceability field 618 can be incorporated into the table 500 instead of, or in addition to, the table 600 to indicate whether specific objects or enhanceable or not.

Although shown in the form of the tables 500 and 600, all or a portion of the information of such tables can be specified in another manner. For example, the information can be included in metadata for an object or package. Or, the information can be included in a configuration file, such as a configuration file for a corresponding extension, where the configuration file can be stored in a tenant container or a shared container in a multitenant environment.

Example 6—Example Classification Assistant

As described in Examples 1 and 2, a classification assistant can be provided to assist an entity, such as a provider of an extension, in migrating the extension to a multi-tenant environment, including a cloud environment. The classification assistant can help facilitate the migration or installation of extensions to the cloud, or other multi-tenant environments, which in turn can facilitate migration of users to the cloud, such as users being onboarded on the tenants in a multi-tenant cloud architecture. Thus, the classification assistant can help facilitate more efficient use of computing resources. As will be further described, the classification assistant can also facilitate data security and integrity by separating extensions from a base application, and by restricting tenants from accessing all or a portion of an extension.

Figure 7:
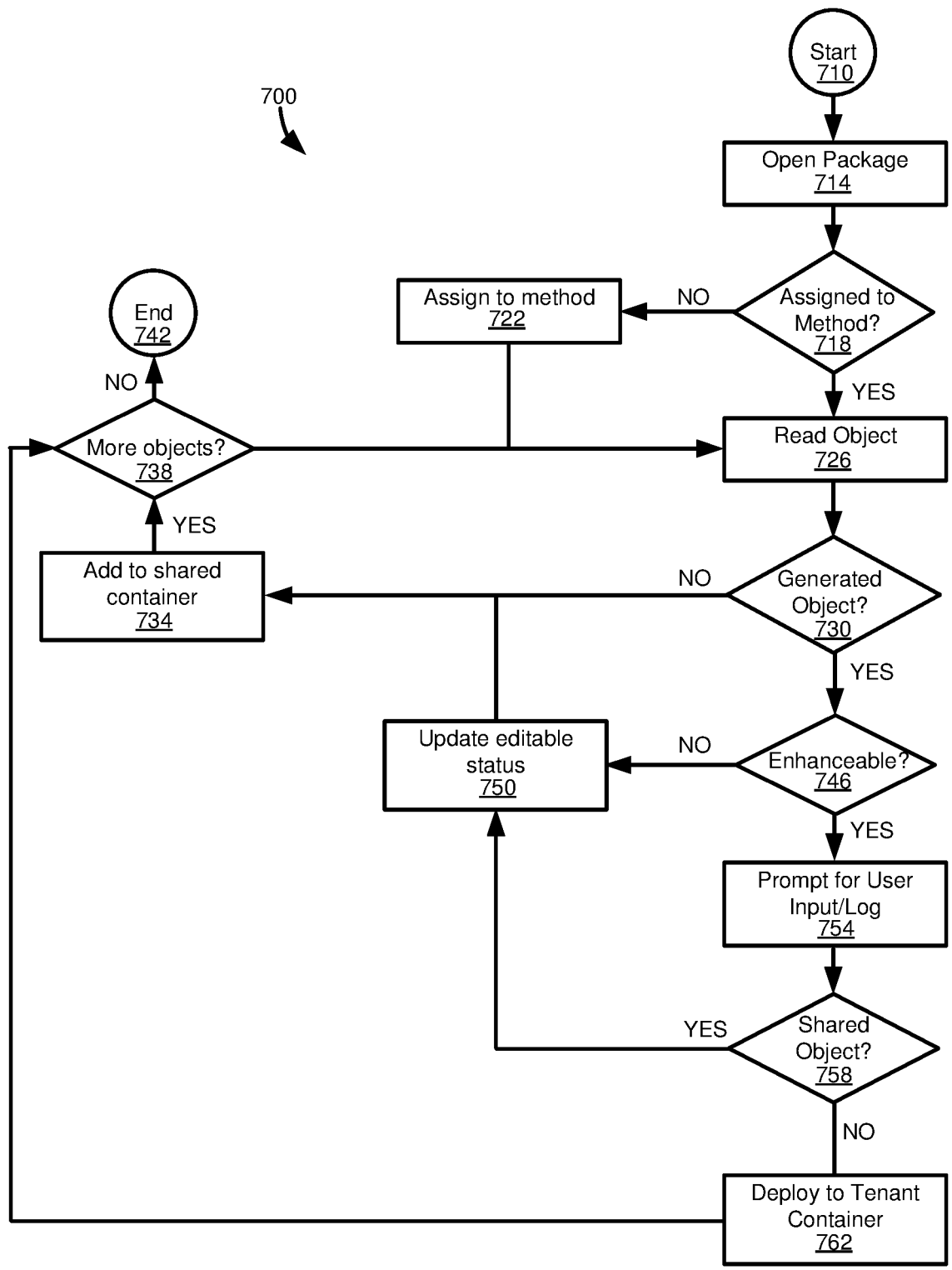
FIG. 7 is a flowchart of example operations in classifying objects in an extension package for deployment to a shared container or one or more tenant containers.

FIG. 7 illustrates operations 700 that can be carried out by a classification assistant. The operations 700 begin at 710, such as by a user (such as a user associated with an entity providing an extension) activating the classification assistant or starting a migration or installation process. A package associated with the extension is opened at 714. Opening the package at 714 can include accessing a repository and reading a list of objects (which can include classes or other program components) in the package.

At 718, it is determined whether the package has been assigned to an object or application function of a base application or application suite. A package being assigned to an object or application of a base application or application suite can assist in placing the code in the shared container and enforcing access restrictions to the code. If it is determined at 718 that the package has not been assigned to an object or application function, it can be assigned to an object or application function at 722. In some cases, assigning the package can include creating a new application object or application function for the package. In other cases, the package can be assigned to an existing object or application function. The assigning can be carried out, in some examples, in response to user input. In other examples, the assigning can be carried out automatically.

If the package was determined at 718 to have been assigned to an object or application function, or after the assigning at 722, the operations 700 can proceed to 726. An object of the package is read at 726, including reading metadata for the object, which can be stored with the object or in another location (such as in a configuration table similar to the table 500 of FIG. 5). At 730 an object type is determined, such as whether the object is a generated object or the object is not a generated object (such as being a compile-time or default object).

If it is determined at 730 that the object is not a generated object, the object can be added to a shared container in a multitenant environment at 734. It is determined at 738 whether more objects are to be analyzed. If so, the operations 700 can return to 726 where a next object is read and processed. If no further objects are to be analyzed, the operations 700 can end at 742.

If it is determined at 730 that the object is a generated object, the operations 700 can proceed to 746, where it is determined whether the object is an object that can be modified, enhanced, or extended by a tenant. If the object is not enhanceable by a tenant, a sharing type of the object can be updated at 750 to indicate that the object is not editable by tenants. The operations 700 can then proceed to 734 and continue as described above.

If it is determined at 746 that the object is modifiable by a tenant, a user can be prompted for user input, or the object logged, at 754. For example, the user can be prompted to confirm whether the object should be a shared object or a tenant-local (i.e., modifiable) object. At 758, it is determined whether the user has indicated that the object should be shared or not. If the object is determined not to be shared, such as being modifiable by a tenant, the object can be deployed, or marked for deployment, to a tenant container at 762. The operations 700 can then proceed to 738. If it is determined at 758 that the object is to be shared, and not modifiable by a tenant, the operations 700 can proceed to 750 and continue as described above.

Example 7—First Example Classification and Deployment Operations

FIG. 8 illustrates a method 800 for classifying objects in an extension package for deployment in a multitenant environment. The method 800 may be carried out, for example, in the environment 300 of FIG. 3. At 808, an extension package, or add on package, for a base application is retrieved. The package includes code defining a plurality of objects. A first object of the plurality of objects is read from the package at 812. At 816, it is determined that the first object is not a generated object. The determining can be carried out, for example, by accessing metadata or configuration data for the first object. Based on determining that the first object is not a generated object, the first object is deployed to a shared container in the multitenant environment at 820.

At 824, a second object of the plurality of objects is read from the package. It is determined at 828 that the second object is a generated object. At 832 it is determined that the second object is not modifiable by an end user. The determining at 828 and 832 may be carried out, for example, by accessing metadata or configuration data for the second object. Based on determining that the second object is not modifiable by an end user, the second object is deployed to the shared container at 836.

Example 8—Second Example Classification and Deployment Operations

FIG. 9 illustrates a flowchart of operations 900 for classifying objects in a package for an application extension or add on for deployment in a multitenant environment. The multitenant environment includes a shared container, accessible by one or more tenants, and one or more tenant containers. The package includes one or more non-generated objects and at least first and second generated objects. The method 900 may be carried out, for example, in the environment 300 of FIG. 3.

At 908, a request is received from a user to classify objects in the package. Non-generated objects are deployed, or marked for deployment, to the shared container at 912. At 916 it is determined that the first generated object is not user-modifiable. Based on the determining, at 920, the first generated object is deployed, or marked for deployment, to the shared container. At 924, it is determined that the second generated object is user modifiable. Based on the determining, at 928, an identifier for the second generated object is displayed to a user. User input is received at 932 to deploy the second generated object to at least a first tenant container of the one or more tenant containers. At 936, the second object is deployed, or marked for deployment, to the at least a first tenant container.

Example 9—Computing Systems

Figure 10:
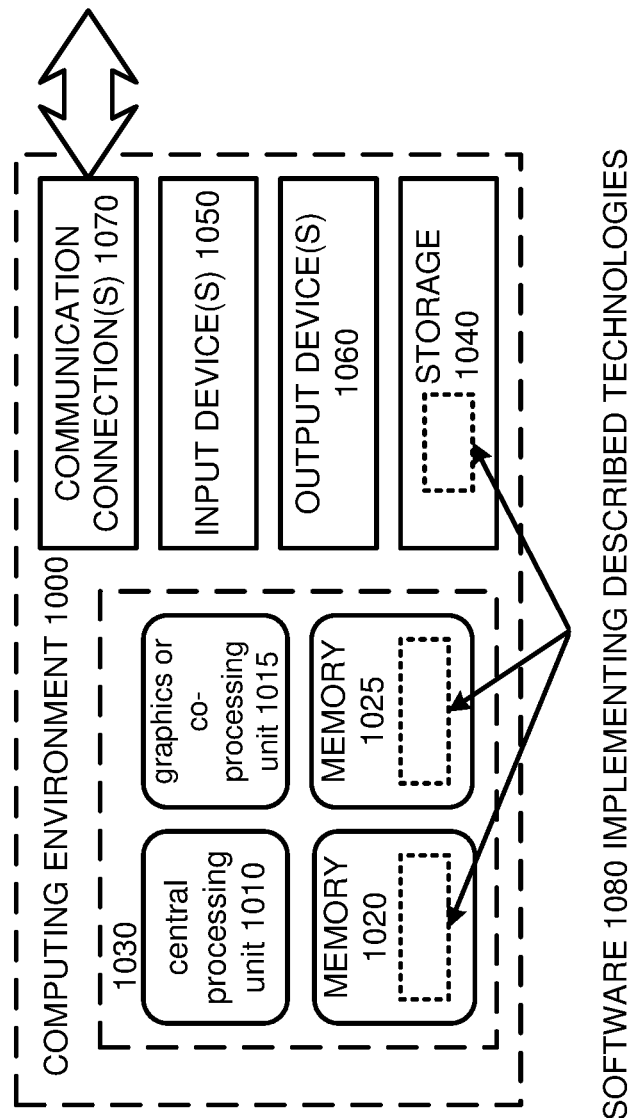
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 11:
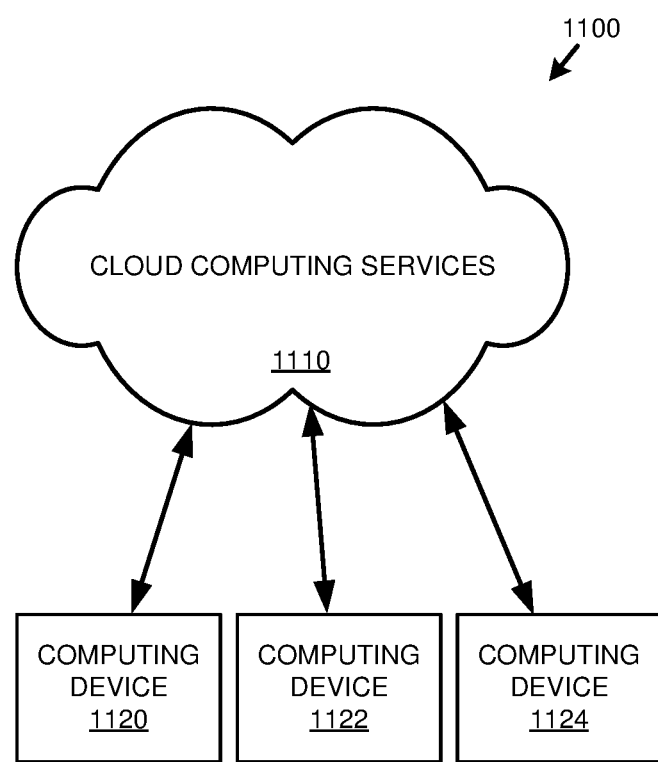
FIG. 11 is an example cloud computing environment that can be used in conjunction with the technologies described herein.

FIG. 11 depicts an example cloud computing environment 1100 in which the described technologies can be implemented, including the environment 300 of FIG. 3. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more computer readable storage media storing instructions that, when loaded into the memory, cause the one or more processing units to perform operations for:
      receiving a request from a user to classify objects in an extension package for deployment to a multi-tenant environment comprising a shared container, accessible by one or more tenants, or one or more tenant containers, wherein the extension package comprises one or more non-generated objects and at least first and second generated objects;
      deploying the non-generated objects to the shared container;
      determining that the first generated object is not user modifiable;
      deploying the first generated object to the shared container;
      determining that the second generated object is user modifiable;
      displaying an identifier for the second generated object to a user;

receiving first user input to deploy the second generated object to at least a first tenant container of the one or more tenant containers; and deploying the second generated object to the at least a first tenant container.

2. The computing system of claim 1, wherein the extension package is associated with an object that is modifiable by a tenant of the one or more tenants and is automatically deployed in a tenant container, of the one or more tenant containers, for the tenant.

3. The computing system of claim 1, wherein the extension package is associated with an object that is modifiable by a user, the object comprising a database table deployed in a database layer of the at least a first tenant container.

4. The computing system of claim 1, wherein the shared container comprises an extension repository and users of the extension repository associated with a tenant of the one or more tenants are not permitted to modify code of one or more base software applications stored in the shared container.

5. The computing system of claim 1, the operations further comprising:

receiving second user input classifying an object of a first type of the extension package as to be stored in an extension repository of the shared container; and setting an indicator for the object of the first type indicating that the object of the first type is not modifiable by tenants of the one or more tenants.

6. The computing system of claim 1, wherein a third generated object comprises metadata indicating that the third generated object is modifiable by an end user and should be deployed in the at least a first tenant container.

7. The computing system of claim 1, the operations further comprising:

determining that a third generated object of the extension package is not modifiable by a user; and based on determining that the third generated object is not modifiable by a user, deploying the third generated object to an extension repository of the shared container.

8. The computing system of claim 1, the operations further comprising:

determining that the extension package is not assigned to a functional code unit registerable with a base software application of one or more base software applications;

generating a functional code unit; and assigning the extension package to the functional code unit.

9. The computing system of claim 1, wherein authorized users of an extension repository of the shared container are prohibited from accessing data of database layers of the one or more tenant containers when a given authorized user of the authorized users of the extension repository is not also an authorized user of a given tenant container of the one or more tenant containers.

10. The computing system of claim 1, wherein an application layer of a tenant container of the one or more tenant containers comprises an identifier of a location of the extension package in an extension repository of the shared container, wherein a user of the tenant container is permitted to read one or more objects of the extension package using the identifier.

11. The computing system of claim 10, wherein the identifier is stored in tenant containers, of the one or more tenant containers, authorized to access the extension package and is not stored in tenant containers, of the one or more tenant container, not authorized to access the extension package.

12. The computing system of claim 1, the operations further comprising:

determining whether a tenant is authorized to access the extension package, wherein a user is permitted to read one or more objects of the extension package if authorized and prohibited otherwise.

13. A computing system that implements an extension package classification service, the computing system comprising:

one or more memories;

one or more processing units coupled to the one or more memories; and one or more non-transitory computer readable storage media storing instructions that, when loaded into the one or more memories, cause the one or more processing units to perform operations for:

retrieving an extension code package for a base application, the extension code package comprising a plurality of objects;

reading a first object of the plurality of objects from the extension code package;

for the first object, determining that the first object is not a generated object;

based on determining that the first object is not a generated object, deploying the first object to a shared container in a multitenant environment;

reading a second object of the plurality of objects from the extension code package;

for the second object of the plurality of objects, determining that the second object is a generated object;

for the second object, determining that the second object is not modifiable by an end user; and for the second object, based on determining that the object is not modifiable by an end user, deploying the second object to the shared container.

14. The computing system of claim 13, wherein the instructions further cause the one or more processing units to perform operations for:

reading a third object of the plurality of objects from the extension code package;

for the third object of the plurality of objects, determining that the third object is a generated object;

for the third object of the plurality of objects, determining that the third object is modifiable by an end user; and deploying the third object to a tenant container.

15. The computing system of claim 14, wherein the instructions further cause the one or more processing units to perform operations for:

displaying to a user a request to classify the third object for deployment to the shared container or the tenant container; and receiving user input to deploy the third object to the tenant container.

16. In a computing environment, a method comprising:

receiving a request from a user to classify objects in an extension package for deployment to a multi-tenant environment comprising a shared container, accessible by one or more tenants, or one or more tenant containers, wherein the extension package comprises one or more non-generated objects and at least first and second generated objects;

deploying the non-generated objects to the shared container;

determining that the first generated object is not user modifiable;

deploying the first generated object to the shared container;

determining that the second generated object is user modifiable;

displaying an identifier for the second generated object to a user;

receiving user input to deploy the second generated object to at least a first tenant container of the one or more tenant containers; and deploying the second generated object to the at least a first tenant container.

17. The method of claim 16, further comprising:

receiving second user input classifying an object of a first type of the extension package as to be stored in an extension repository of the shared container; and setting an indicator for the object of the first type indicating that the object of the first type is not modifiable by tenants of the one or more tenants.

18. The method of claim 16, wherein the extension package is associated with an object that is modifiable by a user, the object comprising a database table deployed in a database layer of the at least a first tenant container.

19. The method of claim 16, wherein the shared container comprises an extension repository and users of the extension repository associated with a tenant of the one or more tenants are not permitted to modify code of one or more base software applications stored in the shared container.

20. The method of claim 16, wherein:

an application layer of a tenant container of the one or more tenant containers comprises an identifier of a location of the extension package in an extension repository of the shared container, wherein a user of the tenant container is permitted to read one or more objects of the extension package using the identifier; and the identifier is stored in tenant containers of the one or more tenant containers authorized to access the extension package and is not stored in tenant containers of the one or more tenant containers not authorized to access the extension package.

* * * * *